(12) United States Patent
Lee

(10) Patent No.: US 7,709,143 B2
(45) Date of Patent: *May 4, 2010

(54) RECHARGEABLE BATTERY

(75) Inventor: Sang-Won Lee, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 707 days.

This patent is subject to a terminal disclaimer.

(21) Appl. No.: 11/190,380

(22) Filed: Jul. 26, 2005

(65) Prior Publication Data
US 2006/0024568 A1 Feb. 2, 2006

(30) Foreign Application Priority Data
Jul. 28, 2004 (KR) ............... 10-2004-0059204

(51) Int. Cl.
H01M 10/16 (2006.01)
(52) U.S. Cl. .................................... 429/208
(58) Field of Classification Search .......... 429/94, 429/130, 131, 133, 142, 161, 181, 186
See application file for complete search history.

(56) References Cited
U.S. PATENT DOCUMENTS

| 5,922,484 A | * | 7/1999 | Frazier ................... 429/10 |
| 6,083,640 A | * | 7/2000 | Lee et al. ............... 429/94 |
| 6,472,097 B1 | | 10/2002 | Ohbayashi et al. |
| 6,893,753 B2 | * | 5/2005 | Iwaizono et al. ........... 429/7 |
| 2003/0129479 A1 | * | 7/2003 | Munenaga et al. .......... 429/94 |
| 2004/0191612 A1 | * | 9/2004 | Akita et al. ............. 429/94 |
| 2005/0214642 A1 | * | 9/2005 | Kim et al. .............. 429/211 |

FOREIGN PATENT DOCUMENTS

| CN | 1271984 A | | 11/2000 |
| JP | 2000-40501 | | 2/2000 |
| JP | 2000-150306 | * | 5/2000 |
| JP | 2001-38475 | | 2/2001 |
| JP | 2001-273931 | | 10/2001 |
| JP | 2002-231297 | | 8/2002 |
| JP | 2004-030946 | | 1/2004 |
| KR | 10-19990068891 | * | 9/1999 |
| KR | 1999-0068891 | | 9/1999 |
| KR | 10-2004-0058915 | | 7/2004 |

OTHER PUBLICATIONS

English Abstract for U.S. Patent 6,472,097, corresponding to CN1271984A.

(Continued)

Primary Examiner—Patrick Ryan
Assistant Examiner—Muhammad Siddiquee
(74) Attorney, Agent, or Firm—Christie, Parker & Hale, LLP

(57) ABSTRACT

A rechargeable battery includes an electrode assembly having a positive electrode, a negative electrode, and a separator positioned between the positive and negative electrodes, a case for housing the electrode assembly, and a spacer positioned between the electrode assembly and the case.

16 Claims, 5 Drawing Sheets

OTHER PUBLICATIONS

Patent Abstracts of Japan, Publication No. 2000-040501; Publication Date Feb. 8, 2000; in the name of Itagaki et al.

Patent Abstracts of Japan, Publication No. 2001-038475; Publication Date Feb. 13, 2001; in the name of Shimoda et al.

English Abstract for U.S. Patent 6,472,097, corresponding to CN1271984A, Date of Publication: Oct. 29, 2002.

U.S. Office action dated May 14, 2008, for related U.S. Appl. No. 11/179,307, noting U.S. Patent 6,083,640 and U.S. Publication 2005/0214642, both previously cited in U.S. Office action dated May 14, 2008.

U.S. Office action dated Dec. 8, 2008, for related U.S. Appl. No. 11/179,307, noting JP 2000-150306, previously cited in U.S. Office action dated Apr. 30, 2009.

U.S. Office action dated Apr. 29, 2009, for related U.S. Appl. No. 11/179,307, noting JP 2000-040501.

Patent Abstracts of Japan, Publication No. 2001-273931, dated Oct. 5, 2001, in the name of Kazutada Fujiwara et al.

Patent Abstracts of Japan, Publication No. 2004-030946, dated Jan. 29, 2004, in the name of Hiroshi Arakawa.

Korean Patent Abstracts, Publication No. 1020040058915, dated Jul. 5, 2004, in the name of Eon Sik Park.

* cited by examiner

RECHARGEABLE BATTERY

CROSS-REFERENCE TO RELATED APPLICATION

This application claims priority to and the benefit of Korean Patent Application No. 10-2004-0059204 filed with the Korean Intellectual Property Office on Jul. 28, 2004, the entire content of which is incorporated herein by reference.

FIELD OF THE INVENTION

The present invention relates to a rechargeable battery, and more particularly to a rechargeable battery having minimal unnecessary internal space.

BACKGROUND OF THE INVENTION

Unlike primary batteries, which cannot be recharged, rechargeable batteries can be repeatedly charged and discharged. Low capacity rechargeable batteries that use single battery cells may be used as power sources for various portable electronic devices such as cellular phones, notebook computers, and camcorders. High capacity rechargeable batteries that use tens of battery cells connected to each other in a battery pack may be used as power sources for driving motors such as in hybrid electric vehicles (HEV). Rechargeable batteries may be classified according to their external shape into cylinders, prisms, or pouches.

Rechargeable batteries generally include an electrode assembly which is formed by spirally winding positive and negative electrodes and a separator into a jelly-roll configuration. The separator is positioned between the positive and negative electrodes and serves as an insulator. The electrode assembly may alternatively be formed by stacking a positive electrode, a negative electrode, and a separator. The electrode assembly is housed in a case, which is closed with a cap assembly having an external terminal.

The structure of an electrode assembly of a prismatic rechargeable battery is described in Japanese Unexamined Patent Application Publication Nos. 2000-40501, and 2001-38475, the entire contents of which are incorporated herein by reference.

Compared to a cylindrical rechargeable battery, a prismatic rechargeable battery is likely to have unnecessary internal "dead space" between the case and an electrode assembly housed therein due to its structure.

The dead space results from the intrinsic shape of the electrode assembly. In the case of electrode assemblies that have a jelly-roll configuration, the electrode assembly has edges that are partially rounded. The rounded edges create gaps within the case, resulting in dead space when the electrode assembly is positioned in the internal space of a battery can.

The dead space may cause an excessive amount of electrolyte to be introduced during fabrication of a rechargeable battery due to the volume of the gap, resulting in wasted electrolyte and performance deterioration of the rechargeable battery.

Particularly, it is necessary for motor driving rechargeable batteries in hybrid electric automobiles to have a configuration adapted to achieve high power, and such problems may be more serious in the case of a large-sized battery than a small-sized battery.

SUMMARY OF THE INVENTION

In one embodiment of the present invention, a rechargeable battery is provided having minimized gaps between the case and the electrode assembly housed therein which avoids excessive use of electrolyte.

The rechargeable battery may include an electrode assembly having a positive electrode, a negative electrode, and a separator positioned between the positive and negative electrodes, a case for housing the electrode assembly, and a spacer positioned in the case, the spacer surrounding the rounded portions of the electrode assembly.

The spacer may include a first spacer which is opposite to and mounted to receive a first end of the electrode assembly, and a second spacer which is opposite to and mounted to receive a second end of the electrode assembly.

The spacer may contain grooves corresponding to the rounded portions of the electrode assembly and bodies that are situated adjacent to the internal side of the case.

The positive and negative electrodes include positive and negative uncoated regions, respectively, the uncoated regions being absent active materials, and which can be positioned opposite each other.

Positive and negative lead connectors are electrically connected to the positive and negative uncoated regions, respectively. Lead connector covers may surround the positive and negative uncoated regions and may be mounted thereto.

The rechargeable battery may further contain positive and negative electrode terminals which are electrically connected to the positive and negative electrodes, respectively, and a cap assembly connected to the case. The spacers may contain terminal insertion slots adapted to insert positive and negative terminals therein. The spacers may include a plurality of through-holes and they may be composed of an insulator. The first and second spacers may be connected to each other by a connector. The lead connector covers and the spacers may be also connected to each other by a connector.

DETAILED DESCRIPTION

Figure 1:
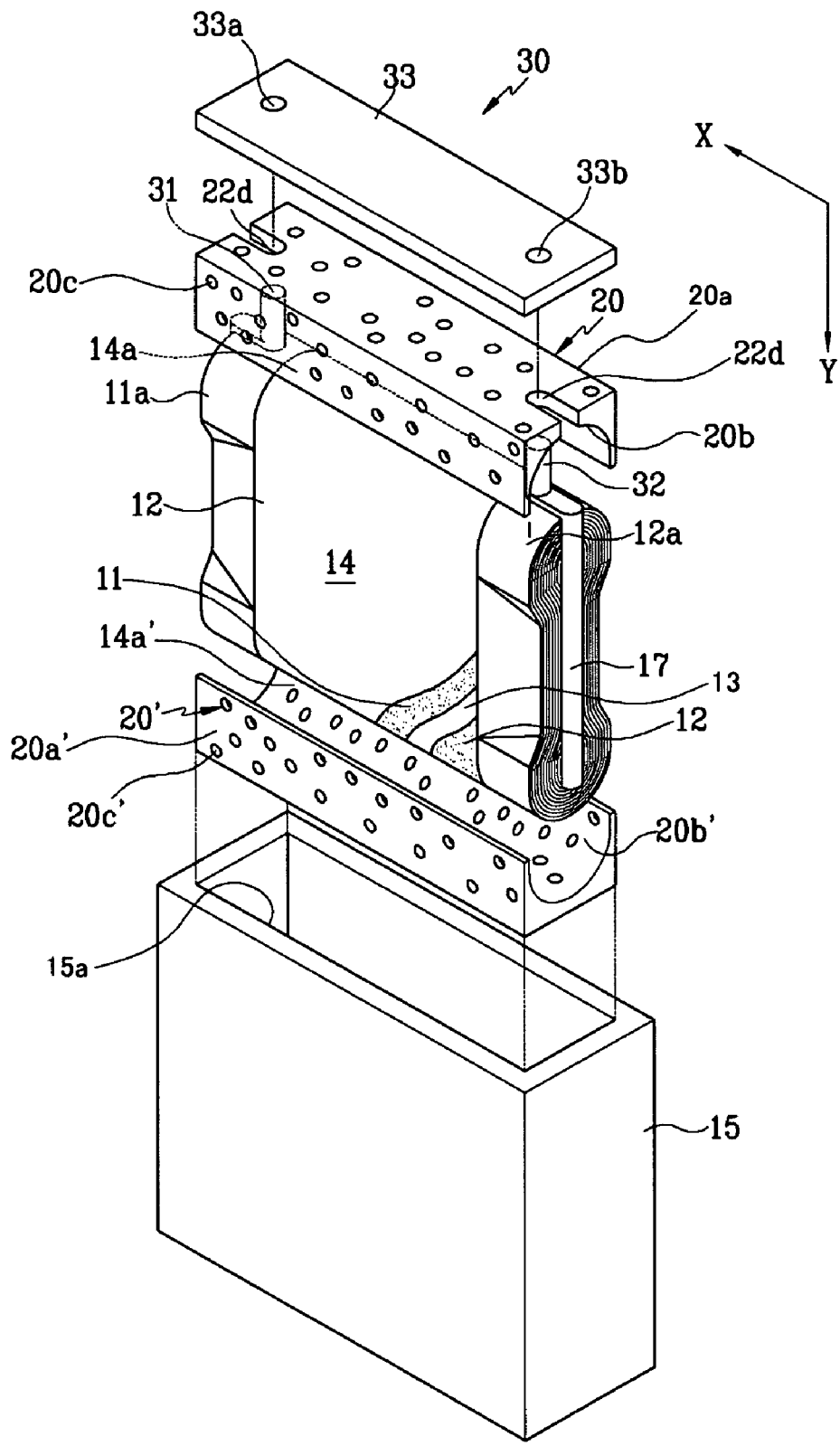
FIG. 1 is an exploded schematic perspective view of a rechargeable battery according to one embodiment of the present invention.
Figure 2:
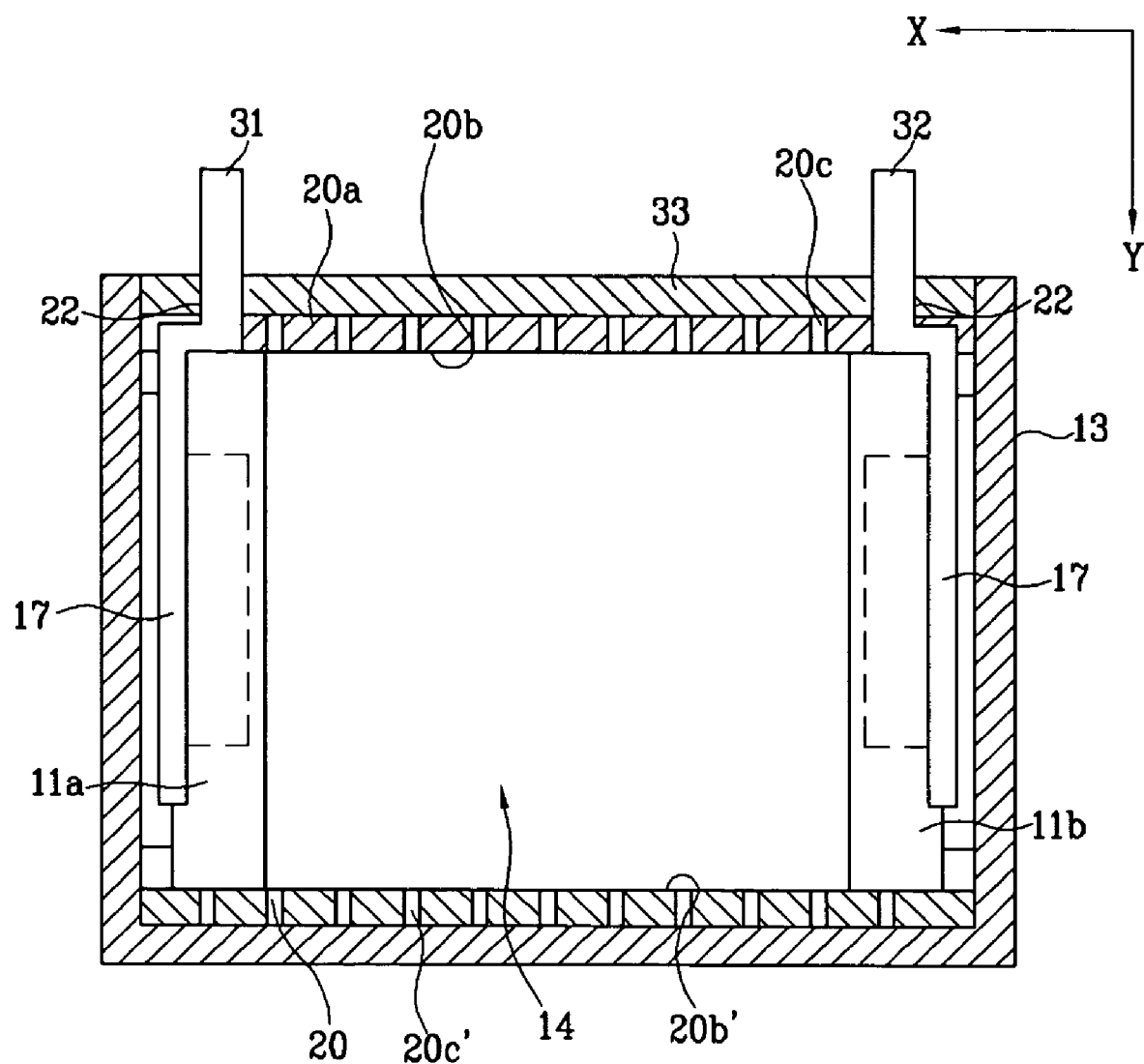
FIG. 2 is a cross-sectional view of a rechargeable battery according to one embodiment of the present invention.

Referring to FIGS. 1 and 2, a rechargeable battery according to one embodiment of the present invention includes an electrode assembly 14 including a positive electrode 11, a negative electrode 12, and a separator 13 positioned between the positive and negative electrodes 11, 12, respectively. The positive and negative electrodes 11, 12, and the separator 13 are spirally wound together in a jelly-roll configuration to form the electrode assembly 14. The electrode assembly 14 is placed in a case 15, and the case 15 is closed with a cap assembly 30. The cap assembly 30 may be coupled to an opening 15a of the case 15, thereby sealing the case. The cap assembly 30 further includes a positive electrode terminal 31 and a negative electrode terminal 32 electrically connected to the electrode assembly 14 by a lead connector 17. Spacers 20, 20' are positioned in gaps between the electrode assembly 14 and the case 15.

The case 15 may include a conductive metal such as aluminum, an aluminum alloy, or nickel-plated steel. The case 15 may take any desired shape that defines an inner space for receiving the electrode assembly 14. For example, the case may be hexagonal, cylindrical, or another shape.

The electrode assembly 14 may have a multi-layered configuration such that the separator 13 is interposed between the positive electrode 11 and the negative electrode 12 on which positive and negative active materials are coated. Alternatively, the electrode assembly 14 may have a jelly-roll configuration such that the positive electrode, the negative electrode, and the separator are sequentially stacked and then spirally wound.

According to the present embodiment, a rechargeable battery is formed by inserting a jelly-roll shaped electrode assembly 14 into a prismatic case 15 as shown in FIG. 1.

In this embodiment, the separator 13 is positioned between the positive and negative electrodes 11, 12, and the electrode assembly 14 is spirally wound into a jelly-roll configuration. The positive and negative electrodes 11, 12, include current collectors coated with active materials. Furthermore, the wound electrode assembly 14 takes a cylindrical shape, but may be pressed into a generally rectangular shape. In this configuration, the positive uncoated region 11a and the negative uncoated region 12a are opposite each other with respect to the outside of the separator 13.

In this regard, the positive terminal 31 is connected to the positive uncoated region 11a, the positive uncoated region being absent a positive active material along the edge of the positive electrode, and the negative terminal 32 is connected to the negative uncoated region 12a, the negative uncoated region being absent a negative active material along the edge of the negative electrode.

The positive terminal 31 and negative terminal 32 are integrated with ends of the lead connectors 17, which are inserted into the positive uncoated region 11a and the negative uncoated region 12a, to be fixed thereto by welding.

After forming the electrode assembly 14 as mentioned above, the positive uncoated region 11a and the negative uncoated region 12a maintain their multi-layered configuration. After the lead connectors 17 are inserted into the positive and negative uncoated regions, the centers of the positive and negative uncoated regions 11a, 12a are tightly pressed in order to couple the regions to the lead connectors 17. Accordingly, the positive and negative uncoated regions 11a, 12a are formed such that their centers are thinner than the upper and lower portions thereof as seen from the sides of the electrode assembly 14.

The cap assembly 30 includes a cap plate 33 that is airtightly coupled to an opening 15a serving as the top of the case 15. On both sides of the cap plate 33, holes 33a, 33b for inserting the positive terminal 31 and the negative terminal 32 are formed.

A portion of the lead connector 17 is inserted into the positive uncoated region 11a and the negative uncoated region 12a, and the remaining portion is exposed along the lengthwise direction of the uncoated regions 11a, 12a to connect with the uncoated regions 11a, 12a by, for example, welding.

However, the structure of the lead connector 17 and a connection structure between the lead connector 17 and the uncoated regions 11a and 12a are not limited thereto, to the specific structure described above, but rather may have a variety of structures.

The spacers 20, 20' are disposed at opposite ends 14a, 14a' of the electrode assembly 14, thereby filling the gap generated when the electrode assembly 14 is inserted into the case 15.

A first spacer 20 is opposite to and is adapted to receive a first end 14a of the electrode assembly 14 to be connected to it. A second spacer 20' is opposite to and is adapted to receive a second end 14a' of the electrode assembly 14 to be connected to it. The first spacer 20 and the second spacer 20' are positioned opposite each other.

In accordance with the present embodiment, the electrode assembly 14 housed inside the case 15 has a positive uncoated region 11a and a negative uncoated region 12a disposed at either side of the case 15, and the first end 14a and the second end 14a' disposed at the top and bottom of the case 15, respectively.

The first end 14a and the second end 14a' may have rounded portions to correspond to the jelly-roll configuration of the electrode assembly 14.

The spacers 20, 20' include bodies 20a, 20a' which have rectangular prism shapes along the direction of the length of the first end 14a and the second end 14a'.

One side of each of the bodies 20a, 20a' (the sides directly opposite to the first end 14a and the second end 14a', respectively) include grooves 20b, 20b' in which the first end 14a and the second end 14a' are inserted, respectively.

Figure 3:
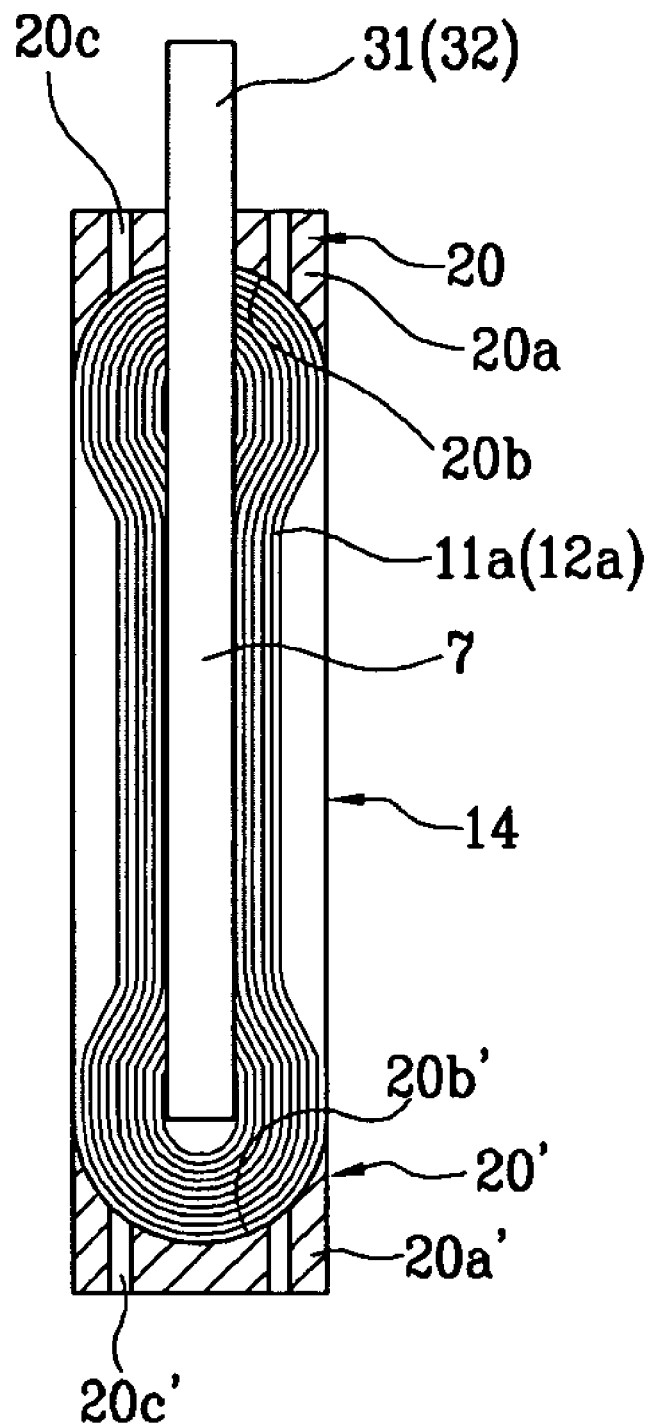
FIG. 3 is a side view of an electrode assembly containing a mounted spacer according to one embodiment of the present invention.

The grooves 20b, 20b' have shapes corresponding to the first end 14a and the second end 14a'. Specifically, the grooves 20b, 20b' have an arch shaped cross-section when viewed along their longitudinal axis (FIG. 3).

Such spacers 20, 20' may include an insulating material so as not to affect the performance of the rechargeable battery. Examples of suitable insulating materials include plastics such as polyimide, or composites of powdered diamond and plastic.

Further, the spacers 20, 20' may include a plurality of through-holes 20c, 20c' for venting heat or gas generated in the case 15. These through-holes 20c, 20c' may act as an inlet for injecting an electrolyte into the case 15 when fabricating a rechargeable battery.

Terminal insertion slots 22d may be formed at both ends of the first spacer 20 so that the positive electrode terminal 31 and negative electrode terminal 32 may be inserted into the holes 33a, 33b of the cap plate 33, respectively, without any interference from the first spacer 20.

When the spacers 20, 20' are inserted into the first end 14a and the second end 14a' of the electrode assembly 14, the first end 14a and the second end 14a' are received in the grooves 20b, 20b' of the spacers 20, 20', respectively, and thereby the first end 14a and the second end 14a' are surrounded by the spacers 20 and 20'.

The positive terminal 31 and the negative terminal 32 are inserted into the terminal insertion slots 22d of the first spacer 20 to be mounted onto the first spacer 20.

When the electrode assembly 14 and spacers 20, 20' connected to each other as above are inserted into the case 15, the spacers 20, 20' may fill up the gap between the electrode assembly 14 and the case 15 and be positioned inside of the case 15, thereby removing unnecessary dead space inside of the case 15 in the rechargeable battery according to the present embodiment.

The spacers 20, 20' are separated from the electrode assembly 14 and the case 15, and therefore may float around inside the case 15 as electrolyte is inserted into the case 15. If the spacers 20, 20' float around, the fixed position between the spacers 20, 20' and the electrode assembly 14 may change, making it difficult for the elements inside the case 15 to maintain their proper positions and potentially resulting in product defects.

Figure 4:
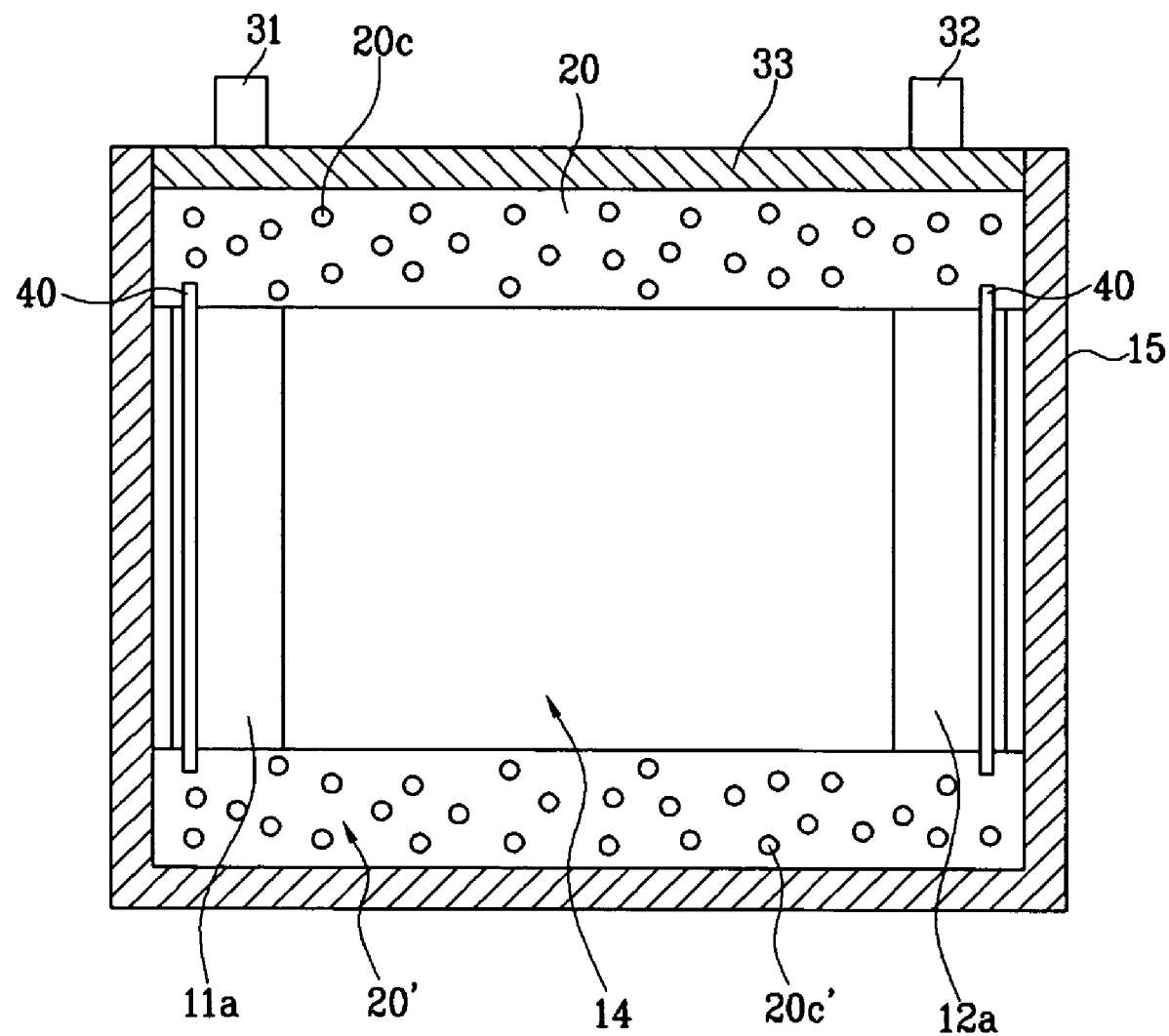
FIG. 4 is a cross-sectional view of a rechargeable battery according to one exemplary embodiment of the present invention.

In order to prevent the spacers 20, 20' from floating and from falling away from the electrolyte assembly 14, the spacers 20, 20' may be fixed to each other by a connector 40 as shown in FIG. 4.

The connector 40 may be an adhesive tape adhering to the spacers 20, 20' to fix them, or a bar to be inserted in the grooves of the spacers 20, 20' to fix them together. The connector 40 is not limited thereto, and may be anything that fixes both spacers 20, 20' together.

Figure 5:
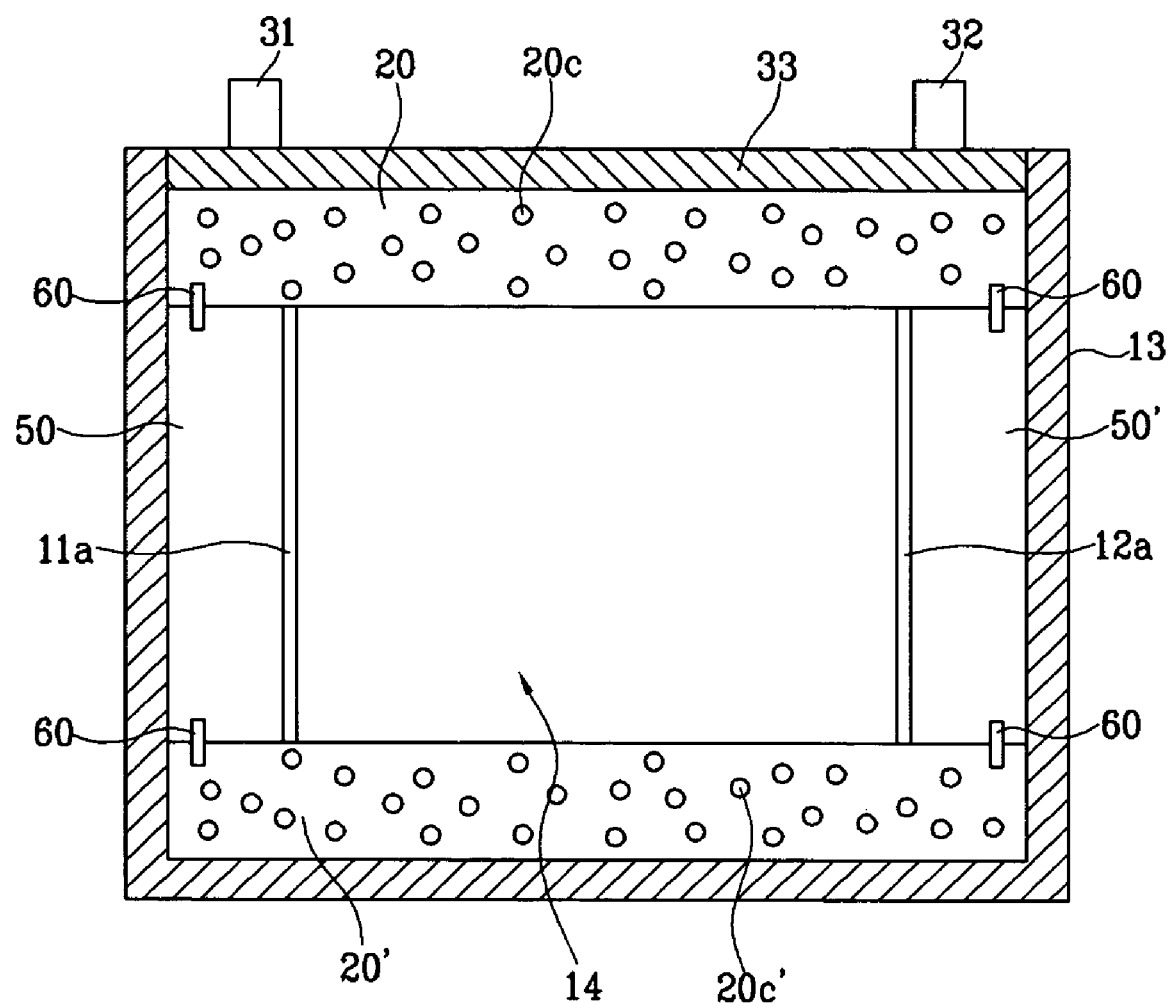
FIG. 5 is a cross-sectional view of a rechargeable battery according to another exemplary embodiment of the present invention.

Furthermore as shown in FIG. 5, lead connector covers 50, 50' may be mounted at both sides of the electrode assembly 14 to cover the lead connector 17 and protect it electrically and physically. These lead connector covers 50, 50' have grooves adapted to receive the positive uncoated region 11a and the negative uncoated region 12a including the lead connectors 17, respectively.

In the present embodiment, both spacers 20, 20' and both lead connector covers 50, 50' are connected by connectors 60 to be fixed to each other.

In one exemplary embodiment of the present invention, spacers connected to rounded portions of the electrode assembly minimize the gap between the electrode assembly 14 and the case 15, thereby preventing leakage of the electrolyte into the gap. This configuration minimizes the electrolyte needed and prevents battery performance deterioration that may occur from excessive electrolyte in the battery.

In exemplary embodiments of a rechargeable battery of the present invention, an uncoated region and a lead connector coupled thereto are surrounded by a shaped cover, thereby protecting them from external impact. The cover according to the present invention prevents potential breakdown of the uncoated regions 11a, 12a caused by external impact energy, thereby preventing disconnection of the uncoated regions 11a, 12a from the lead connectors 17. As a result, battery durability is improved.

The rechargeable batteries of the present invention are useful as power sources for high power electric devices driven by motors, such as electric vehicles (EV), hybrid electric vehicles (HEV), wireless vacuum cleaners, motorbikes, motor scooters, and the like.

Although exemplary embodiments of the present invention have been described, those skilled in the art will understand that various modifications and variations can be made without departing from the spirit and scope of the present invention as disclosed in the accompanying claims.

What is claimed is:

1. A rechargeable battery comprising:
   an electrode assembly having a positive electrode, a negative electrode, and a separator between the positive electrode and the negative electrode, the electrode assembly having at least one rounded side;
   a case for housing the electrode assembly; and
   at least one spacer in the case, the at least one spacer having a plurality of through holes in communication with the at least one rounded side and adapted to permit electrolyte flow, and an arch shaped groove adapted to mate with the at least one rounded side, wherein the at least one spacer occupies substantially an entire space between the case and the at least one rounded side of the electrode assembly.

2. The rechargeable battery of claim 1, wherein the at least one spacer comprises a first spacer mounted to a first side of the electrode assembly, and a second spacer opposite to the first spacer and mounted to a second side of the electrode assembly.

3. The rechargeable battery of claim 1, wherein the case has at least one substantially flat side extending substantially parallel to the at least one rounded side of the electrode assembly and wherein the at least one spacer comprises a body having at least one side adapted to mate with the at least one substantially flat side of the case.

4. The rechargeable battery of claim 1, wherein the positive electrode and the negative electrode include a positive uncoated region and a negative uncoated region, respectively, on which active materials are absent, and wherein the positive electrode and the negative electrode are opposite each other.

5. The rechargeable battery of claim 4, further comprising:
   a positive lead connector and a negative lead connector electrically connectable to the positive uncoated region and the negative uncoated region, respectively; and
   a lead connector cover surrounding and mountable to each of the positive uncoated region and the negative uncoated region.

6. The rechargeable battery of claim 1, further comprising:
   a cap assembly connected to the case; and
   a positive electrode terminal and a negative electrode terminal electrically connected to the positive electrode and the negative electrode, respectively;
   wherein the at least one spacer includes terminal insertion slots adapted to receive the positive terminal and the negative terminal.

7. The rechargeable battery of claim 1, wherein the at least one spacer comprises an insulating material.

8. The rechargeable battery of claim 2, wherein the first spacer and the second spacer are connected by a connector.

9. The rechargeable battery of claim 5, wherein each lead connector cover and the at least one spacer are connected by a connector.

10. The rechargeable battery of claim 1, wherein the electrode assembly has a jelly-roll configuration.

11. The rechargeable battery of claim 1, wherein the rechargeable battery has a prismatic shape.

12. The rechargeable battery of claim 1, wherein the rechargeable battery is adapted for use with a motor driven device.

13. A rechargeable battery comprising:
   an electrode assembly having a positive electrode, a negative electrode, and a separator positioned between the positive electrode and the negative electrode; the electrode assembly having at least one rounded side;
   a case for housing the electrode assembly, the case having at least one non-rounded interior surface; and
   at least one spacer in the case extending along and conforming to substantially an entire length of the at least one rounded side of the electrode assembly and conforming to the at least one non-rounded interior surface of the case to substantially fill a space between the rounded side of the electrode assembly and the case, wherein the at least one spacer has a plurality of through holes in communication with the at least one rounded side and adapted to permit electrolyte flow.

14. The rechargeable battery of claim 13, wherein the at least one spacer comprises a first spacer mounted to a first side of the electrode assembly, and a second spacer opposite to the first spacer and mounted to a second side of the electrode assembly.

15. The rechargeable battery of claim 13, wherein the positive electrode and the negative electrode include a positive uncoated region and a negative uncoated region, respectively, on which active materials are absent, and wherein the positive electrode and the negative electrode are opposite each other.

16. The rechargeable battery of claim 13, further comprising:

a cap assembly connected to the case; and a positive electrode terminal and a negative electrode terminal electrically connected to the positive electrode and the negative electrode, respectively;

wherein the at least one spacer includes terminal insertion slots adapted to receive the positive terminal and the negative terminal.

* * * * *